(12) United States Patent
Kwiatkowski et al.

(10) Patent No.: US 11,481,646 B2
(45) Date of Patent: Oct. 25, 2022

(54) SELECTING ANSWER SPANS FROM ELECTRONIC DOCUMENTS USING NEURAL NETWORKS

(71) Applicant: Google LLC, Mountain View, CA (US)

(72) Inventors: Thomas Mieczyslaw Kwiatkowski, Brooklyn, NY (US); Ankur P. Parikh, New York, NY (US); Swabha Swayamdipta, Seattle, WA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 16/759,692

(22) PCT Filed: Oct. 29, 2018

(86) PCT No.: PCT/US2018/058036
§ 371 (c)(1),
(2) Date: Apr. 27, 2020

(87) PCT Pub. No.: WO2019/084558
PCT Pub. Date: May 2, 2019

(65) Prior Publication Data
US 2020/0265327 A1 Aug. 20, 2020

Related U.S. Application Data

(60) Provisional application No. 62/578,347, filed on Oct. 27, 2017.

(51) Int. Cl.
*G06F 15/00* (2006.01)
*G06N 3/08* (2006.01)
(Continued)

(52) U.S. Cl.
CPC ............... *G06N 5/04* (2013.01); *G06F 40/30* (2020.01); *G06K 9/6215* (2013.01);
(Continued)

(58) Field of Classification Search
None
See application file for complete search history.

(56) References Cited

U.S. PATENT DOCUMENTS 8,051,139 B1 * 11/2011 Musat .................. G06Q 10/107
709/200
9,767,165 B1 * 9/2017 Tacchi .................. G06F 16/345
(Continued)

OTHER PUBLICATIONS

EP Office Action in European Application No. 18804461.4, dated Aug. 18, 2020, 9 pages.
(Continued)

*Primary Examiner* — Satwant K Singh
(74) *Attorney, Agent, or Firm* — Fish & Richardson P.C.

(57) ABSTRACT

Methods, systems, and apparatus, including computer programs encoded on computer storage media, for selecting a text span from an input electronic document that answers an input question. One of the methods includes obtaining a respective first numeric representations of text spans in the input document; for each of the text spans: determining, for a segment that contains the text span, a question-aware segment vector, determining, for the question, a segment-aware question vector, and processing the first numeric representation of the text span, the question-aware segment vector, and the segment-aware question vector using a second feedforward neural network to generate a second numeric representation of the text span; for each unique text span in the plurality of text spans: determining an aggregate representation for the unique text span, and determining, from the aggregate representation, a final score for the unique text span; and selecting a unique text span.

20 Claims, 4 Drawing Sheets

(51) Int. Cl.
  *G06N 5/04* (2006.01)
  *G06F 40/30* (2020.01)
  *G06K 9/62* (2022.01)
  *G06N 3/04* (2006.01)
  *G06V 30/40* (2022.01)

(52) U.S. Cl.
  CPC ............. *G06N 3/0454* (2013.01); *G06N 3/08* (2013.01); *G06V 30/40* (2022.01)

(56) References Cited

U.S. PATENT DOCUMENTS

| | | | |
|---|---|---|---|
| 2006/0155751 A1* | 7/2006 | Geshwind | G06F 16/3338 707/999.102 |
| 2018/0032606 A1* | 2/2018 | Tolman | G06F 16/951 |
| 2020/0311113 A1* | 10/2020 | Gao | G06N 20/20 |

OTHER PUBLICATIONS

Abadi et al., "Tensorflow: Large-scale machine learning on heterogeneous distributed systems", arXiv:1603.04467, Mar. 2016, 19 pages.
Al-Rfou et al., "Conversational contextual cues: The case of personalization and history for response ranking", arXiv:1606.00372, Jun. 2016, 10 pages.
Bachrach et al., "An Attention Mechanism for Neural Answer Selection Using a Combined Global and Local View", arxiv:1707.01378, Sep. 2017, 8 pages.
Bahdanau et al., Neural machine translation by jointly learning to align and translate, arXiv:1409.0473, Sep. 2014.
Chen et al., "Reading Wikipedia to answer open-domain questions", arXiv:1704.00051, Apr. 2017, 10 pages.
Chen et al., "Smarnet: Teaching machines to read and comprehend like human", arXiv:1710.02772, Oct. 2017, 9 pages.
Choi et al., "Coarse-to-fine question answering for long documents", Proc. of ACL, Jul. 2017, pp. 209-220.
Duchi et al., "Adaptive subgradient methods for online learning and stochastic optimization. Journal of Machine Learning Research", Journal of Machine Learning Research, Jul. 2011, 12:2121-2159.
Glorot et al., "Deep sparse rectifier neural networks", Proc. of AISTATS, 2011, 15:315-323.
Hermann et al., "Teaching machines to read and comprehend", arXiv:1506.03340, Nov. 2015, 14 pages.
Hill et al., The Goldilocks principle: Reading children's books with explicit memory representations, arXiv:1511.02301, Nov. 2015, 13 pages.
Hinton et al., "Improving neural networks by preventing co-adaptation of feature detectors", arXiv:1207.0580, Jul. 2012, 18 pages.
Hirschman et al., "Deep read: A reading comprehension system", Proc. of ACL, Jun. 1999, pp. 325-332.
Hochreiter et al., "Long short-term memory", Neural Computation, Nov. 1997, 9(8):1735-1780.
Hu et al., "Reinforced Mnemonic Reader for Machine Comprehension", arXiv:1705.02798v6, Jun. 2018, 8 pages.
PCT International Preliminary Report on Patentability and Written Opinion in International Application No. PCT/US2018/058036, dated May 7, 2020, 11 pages.
PCT International Search Report and Written Opinion in International Application No. PCT/US2015/058036, dated Feb. 12, 2019, 17 pages.
Joshi et al., "TriviaQA: A Large Scale Distantly Supervised Challenge Dataset for Reading Comprehension", arXiv:1705.03551v2, May 2017, 11 pages.
Kadlec et al., "Text understanding with the attention sum reader network", arXiv:1603.01547, Jun. 2016, 11 pages.
Lee et al., "Learning recurrent span representations for extractive question answering", arXiv:1611.01436, Nov. 2016, 9 pages.
Nair et al., "Rectified linear units improve restricted Boltzmann machines", Proc. of ICML, Jun. 2010, pp. 807-814.
Pan et al., "MEMEN: Multi-layer Embedding with Memory Networks for Machine Comprehension", arXiv:1707.09098v1, Jul. 2017, 7 pages.
Parikh et al., "A decomposable attention model for natural language inference", arXiV:1606.01933, Sep. 2016, 7 pages.
Pennington et al., "GloVe: Global vectors for word representation", Proc. of EMNLP, Oct. 2014, pp. 1532-1543.
Rajpurkar et al., "SQuAD: 100,000+ questions for machine comprehension of text", arXiv:1606.05250, Oct. 2016, 10 pages.
Seo et al., "Bidirectional attention flow for machine comprehension", arXiv:1611.01603, Nov. 2016, 13 pages.
Srivastava et al., "Dropout: a simple way to prevent neural networks from overfitting", Journal of machine learning research, Jun. 2014, 15(1):1929-1958.
Wang et al., "Gated self-matching networks for reading comprehension and question answering", Proceedings of the 55th Annual Meeting of the Association for Computational Linguistics, Jul. 2017, 1:189-198.
Wang et al., "Machine comprehension using match-lstm and answer pointer", arXiv:1608.07905, Nov. 2016, 11 pages.
Weissenborn et al., "Making Neural QA as Simple as Possible but not Simpler", arxiv:1703.04816, Jun. 2017, 12 pages.
Weston et al., "Memory networks", arXiv:1410.3916, Oct. 2014, 15 pages.
Xiong et al., "Dynamic coattention networks for question answering", arXiv:1611.01604, Nov. 2016, 14 pages.

\* cited by examiner

SELECTING ANSWER SPANS FROM ELECTRONIC DOCUMENTS USING NEURAL NETWORKS

CROSS-REFERENCE TO RELATED APPLICATION

This application claims priority to U.S. Patent Application Ser. No. 62/578,347, filed on Oct. 27, 2017, the entire contents of which are hereby incorporated by reference.

BACKGROUND

This specification relates to processing electronic documents using machine learning models, e.g., neural networks.

Electronic documents can be any of a variety of documents that are maintained in electronic form and can be viewed by a user on a computer, e.g., web pages, word processing documents, text documents, spreadsheets, and so on.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations that selects a text span from an input electronic document that answers an input question that includes a plurality of question tokens.

The subject matter described in this specification can be implemented in particular embodiments so as to realize one or more of the following advantages.

By employing lightweight, i.e., computationally-efficient, models that are combined in a cascade to find the answer to an input question, the described systems can effectively locate text in an input document that answers the input question. In particular, the described systems can outperform more complex, less computationally-efficient, architectures. Thus, the described systems can effectively answer received questions while consuming fewer computing resources, e.g., less memory and less processing power, than conventional approaches, which may be particularly advantageous when the systems are implemented in resource-constrained environments, e.g., on mobile devices. In particular, the systems can attain state-of-the-art results on many question answering tasks despite consuming many fewer computational resources than previously state-of-the-art systems, e.g., systems which use computationally-intensive recurrent neural networks to process document tokens, questions tokens, or both.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system that selects a text span from an electronic document that answers a received question. A text span is a sequence of one or more consecutive words from the electronic document.

Once the system has selected a text span as an answer to the question, the system (or another system) can output the selected text span as part of a response to the question.

For example, the input question may have been submitted as a voice query, and the system can provide a spoken utterance of the selected text span as part of a response to the query. As a particular example, a mobile device, a smart speaker, or another computing device that interacts with the user using voice inputs can receive a voice query spoken by the user and transmit the received query to the system, e.g., over a data communication network. The system can then identify a candidate electronic document that may contain the answer to the received query, select a text span from the document using the techniques described in this specification, and then transmit the text span to the computing device as part of a response to the voice query, i.e., as data representing a verbal utterance of the text span or as text for conversion to speech at the computing device. In some cases, the user can explicitly or implicitly identify the candidate document. For example, if the user submitted the voice query while viewing a given document using the computing device, the system can identify the given document as the candidate electronic document. In some other cases, an external system, e.g., an Internet search engine, identifies the candidate electronic document in response to the query and provides the candidate electronic document to the system.

As another example, the system can receive the question as a text query, and can provide the text span for presentation on a user device as part of the response to the text query. For example, an Internet search engine can receive the text query and the text span identified by the system can be included by the Internet search engine as part of the response to the search query, e.g., as a formatted presentation of content along with search results identified by the Internet search engine as being responsive to the query.

Figure 1A:
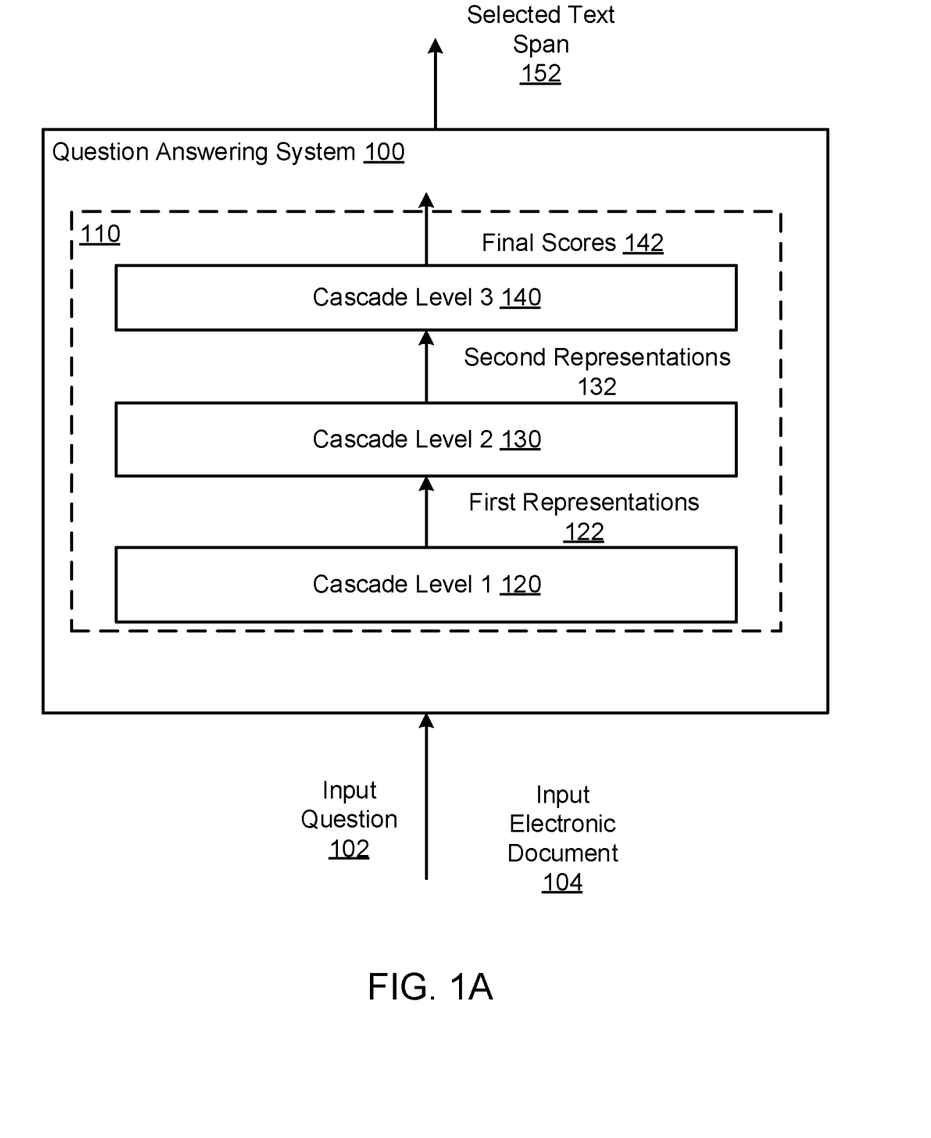
FIG. 1A shows an example question answering system.

FIG. 1A shows an example question answering system 100. The question answering system 100 is an example of a system implemented as computer programs on one or more computers in one or more locations, in which the systems, components, and techniques described below are implemented.

As described above, the system 100 receives an input question 102 and an input electronic document 104 and identifies a text span 152 from the electronic document 104 that the system has determined provides an answer to the input question 102. In particular, both the input question 102 and the electronic document 104 are tokenized, i.e., so that the text of both the input question 102 and the electronic document 104 is represented as a respective set of tokens. A token can be, e.g., a word, a phrase, or other n-gram selected from a vocabulary of possible tokens.

When the electronic document 104 is received, the system 100 identifies candidate text spans in the document. For example, the system 100 can identify as a candidate text span each possible consecutive sequence of one or more tokens in the document that includes fewer than a threshold number of tokens.

Because the same candidate text span can occur multiple times throughout the electronic document, the system 100 also identifies, from the candidate text spans in the document, a set of unique text spans, i.e., so that no text span in the set of unique text spans corresponds to any other text span in the set of unique text spans. As one example, the system 100 can consider one text span to correspond to another if the two text spans are within a threshold edit distance of one another. As another example, the system 100 can consider two text spans to correspond if they are determined to refer to the same entity by a named entity recognition system.

The system 100 then uses a cascaded machine learning system 110, i.e., a machine learning system having a cascaded model architecture, to select a text span from the set of unique text spans as the text span 152 that answers the input question.

The cascaded model architecture has three levels of machine learning models: level 1 120, level 2 130, and level 3 140. The architecture is referred to as a "cascade" because the model(s) in each layer of the cascade receive as input the outputs of model(s) in previous layers of the cascade. The model(s) in the final layer of the cascade, i.e., layer 3, generate the final prediction of the machine learning system 110 from the output of the model in the previous layer, i.e., layer 2.

More specifically, level 1 of the cascade operates on simple features of the question and the candidate text spans to generate a respective first numeric representation 122 of each text span. A numeric representation is an ordered collection of numeric values, e.g., a vector, a matrix, or higher-order tensor of floating-point values or of quantized floating-point values.

In particular, the model(s) in level 1 operate only on embeddings from a dictionary of pre-trained token embeddings and, optionally, a binary question-word feature that indicates whether a given span contains a token from the question. An embedding is a vector of numeric values in a fixed dimensional space. Because the embeddings have been pre-trained, positions of the embeddings in the fixed dimensional space reflect similarities, e.g., semantic similarities, between the tokens that they represent. As one example, the embedding for the word "king" may be closer in the fixed dimensional space to the embedding for the word "queen" than the embedding for the word "pawn." Examples of such pre-trained embeddings that can be used by the system 100 include word2vec embeddings and GloVe embeddings.

The model in layer 2 of the cascade uses the first numeric representations 122 generated by level 1 along with an attention mechanism that, for each candidate span, aligns question tokens with tokens in the document segment that contains the candidate span, e.g., the sentence, paragraph or other group of tokens in the electronic document that contains the candidate span, to generate a respective second numeric representation 132 for each candidate answer span.

The model in layer 3 receives the second numeric representations 132 of the candidate text spans and aggregates information from all the candidate answer spans which are mentioned multiple times in the document, i.e., that occur multiple times throughout the document, in order to determine a respective final score 142 for each unique text span. The final score 142 for a given unique text span measures how well the unique text span answers the question.

The operation of the cascaded machine learning system 110 will be described in more detail below with reference to FIGS. 1B and 3.

The system 100 then selects a text span 152 from the unique text spans based on the final scores. For example, the system 100 can select the unique text span having the highest final score as the answer to the question.

In order to allow the cascaded machine learning system 110 to effectively score answer spans, i.e., so that the final scores generated by level 3 of the cascade can be used to accurately identify answers to input questions, the system 100 trains the machine learning models in the cascade on training data that includes labeled training examples. That is, each labeled training example includes a question—electronic document pair that is labeled with data identifying the correct text span, i.e., the text span from the electronic document that best answers the question. Training the machine learning models in the cascade on this training data is described in more detail below with reference to FIGS. 1B and 2.

Figure 1B:
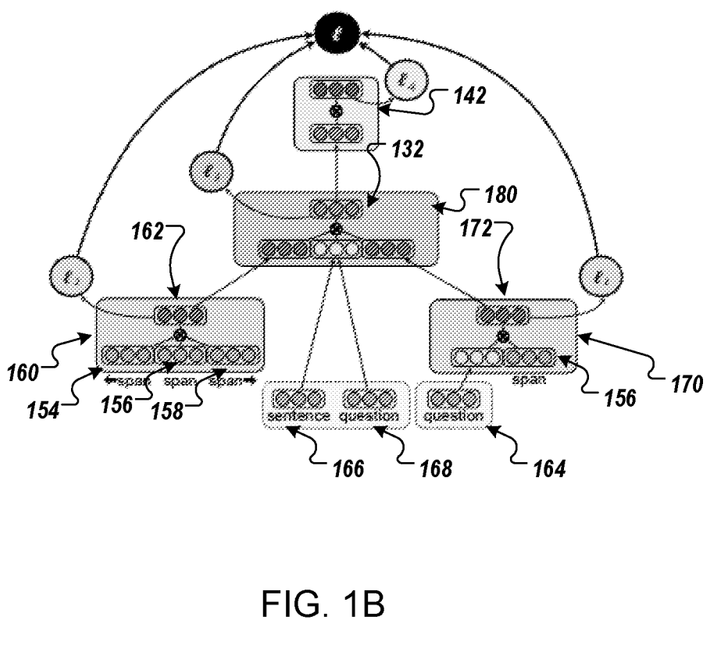
FIG. 1B shows an example architecture of the cascaded machine learning system.

FIG. 1B shows an example architecture of the cascaded machine learning system 110.

As shown in FIG. 1B, level 1 of the cascade includes two models: a span+short context model 160 and a question+span model 170 that collectively generate the first numeric representation.

For any given text span, model 160 operates on (i) an initial representation 154 of the left context of the text span in the input document, (ii) an initial representation 156 of the text span, and (iii) an initial representation 158 of the right context of the text span in the input document to generate as output a span-context representation 162 of the text span.

The initial representation of the text span is generated based on the pre-trained embeddings of the tokens in the text span. In some implementations, the initial representation of the text span is a bag of words embedding of the tokens in the text span, i.e., an average of the embeddings of the tokens in the text span. In some other implementations, the initial representation of the text span is a concatenation of a bag of words embedding of the tokens in the text span and a question-word feature that indicates whether the text span includes any of the question tokens. The question-word feature can be a binary feature, e.g., that has the value 1 when the text span includes one or more question tokens and has the value 0 when the text span does not include any of the question tokens.

The initial representation of the left context is a bag of words embedding of the tokens in the left context of the text span, i.e., an average of the embeddings of the K tokens to the immediate left of the text span in the input document.

Similarly, the initial representation of the right context is a bag of words embedding of the tokens in the right context of the text span, i.e., an average of the embeddings of the K tokens to the immediate right of the text span in the input document.

To generate the span-context representation of the text span, the model 160 processes a concatenation of (i) the initial representation of the left context of the text span in the input document, (ii) the initial representation of the text span, and (iii) the initial representation of the right context of the text span in the input document using a feed-forward neural network. In some implementations, the neural network is two-layer feed-forward neural network with rectified linear unit (ReLU) activations. In particular, in these implementations, the operations performed by the feed-forward neural network to generate a representation h from an input x can be expressed as:

$$h = \mathit{ffnn}(x)$$
$$= ReLU\{U\{ReLU\{Vx + a\}\}b\},$$

where U and V parameter matrices and a and b are parameter biases of the feed-forward network.

While not used during inference, during training the model 160 is also configured to generate a score for the text span that, like the final score, measures how well the unique text span answers the question (shown in FIG. 1B as the input to a loss term $l_2$). In particular, the model 160 can generate the score by processing the span-context representation 162 of the text span through a linear prediction layer that maps a vector to a single value. In particular, the operations performed by the linear prediction layer to generate a value $\varphi$ from an input representation h can be expressed as:

$$\varphi = \mathrm{linear}(h)$$
$$= w^T h + z,$$

where w and z are parameters of the linear prediction layer.

Using the score generated by the model 160 for training is described in more detail below.

For any given text span, model 170 operates on (i) the initial representation of the text span 156 and (ii) an initial representation 164 of the question to generate a question-span representation 172 of the text span.

In particular, the model 170 first generates a weight for each of the question tokens based on the embedding of each question token.

The model 170 can generate a weight for the question token by first applying another feed-forward neural network, i.e., applying the ffnn operations, to the embedding of the question token to generate an initial representation of the question token and then applying another linear prediction layer to the initial representation of the question token.

The model 170 can then generate the initial representation of the question token by computing a weighted average of the embeddings for the question token, with the embedding for each question token being weighted by a normalized version of the computed weight.

Once the initial representation of the question has been generated, the model 170 generates the question-span representation of the text span by applying another feed-forward neural network, i.e., applying the ffnn operations described above, to a concatenation of the initial representation of the text span and an initial representation of the question.

While not used during inference, during training the model 170 is also configured to generate a score for the text span that, like the final score, measures how well the unique text span answers the question. In particular, the model 170 can generate the score by processing the question-span representation of the text span through another linear prediction layer.

The first numeric representation 122 of the text span is a concatenation of the question-span representation and the span-context representation and is provided as input to level 2 of the cascade.

Level 2 of the cascade includes a context attention model 180 that, for a given question span, operates on the first numeric representation 122 to generate the second numeric representation 132 of the question span.

For a given text span, the model 180 generates, (i) for a segment that contains the text span in the input document, a question-aware segment vector 166 that is based on a similarity between the question tokens in the question and segment tokens in the segment that contains the text span and (ii) for the question, a segment-aware question vector 168 for the question that is also based on the similarity between the question tokens in the question and segment tokens in the segment that contains the text span.

To generate these two vectors, the model 180 measures the similarity between every pair of question and segment embeddings, i.e., generates a respective similarity score between each question embedding and each segment embedding. To generate the similarity score $\eta_{ij}$ for a given question embedding $q_i$—segment embedding $d_j$ pair, the model 180 performs the following operations:

$$\eta_{ij} = \mathit{ffnn}(q_i)^T \mathit{ffnn}(d_j).$$

To generate the question-aware segment vector for the segment in the input document that contains the text span, the model 180 then determines a respective attended vector for each segment token that accounts for the similarity of the segment token to the question tokens as reflected by the similarity scores and determines the question-aware segment vector from the attended vectors for the segment tokens.

To determine the segment-aware question vector for the question, the model 180 determines a respective attended vector for each question token that measures a similarity of the question token to the segment tokens as reflected by the similarity sores and determines the segment-aware question vector from the attended vectors for the question tokens.

In particular, to generate the question-aware segment vector, each original segment embedding vector and its corresponding attended vector are concatenated and passed through another feed-forward net, the representations generated by which are summed to obtain the question-aware segment vector. Similarly, each original question embedding vector and its corresponding attended vector are concatenated and passed through this feed-forward net, the representations generated by which are summed to obtain the segment-aware question vector.

The model 180 then processes a concatenation of the first numeric representation of the text span, the question-aware segment vector, the segment-aware question vector, and, optionally, the question-span feature using another feedforward neural network to generate the second numeric representation of the text span.

While not used during inference, during training the model 180 is also configured to generate a score for the text span that, like the final score, measures how well the unique text span answers the question. In particular, the model 180 can generate the score by processing the second numeric representation of the text span through another linear prediction layer.

Level 3 includes an aggregating multiple mentions model 190 that receives the second numeric representations 132 of the candidate answer spans and aggregates information from all the candidate answer spans which occur multiple times throughout the document based on the second numeric representations 132.

In particular, for each unique question span, the model 190 processes the second numeric representations for each of the text spans that correspond to the unique text span using another feedforward neural network to generate a respective transformed numeric representation for each of the text spans. The model 190 then determines the aggregate representation for the unique text span by summing the transformed numeric representations of the candidate text spans that correspond to the unique text span.

The model 190 then generates the final score 142 for the unique text span by processing the aggregate representation of the unique text span through another linear prediction layer.

While the architectures of the various feed-forward neural networks and the various linear projection layers employed by the models 160-190 are generally the same, each feedforward neural network and linear projection layer generally has different parameter values from each other neural network or projection layer. To determine these parameter values, the system 100 trains the cascaded machine learning system 110 on training data.

Figure 2:
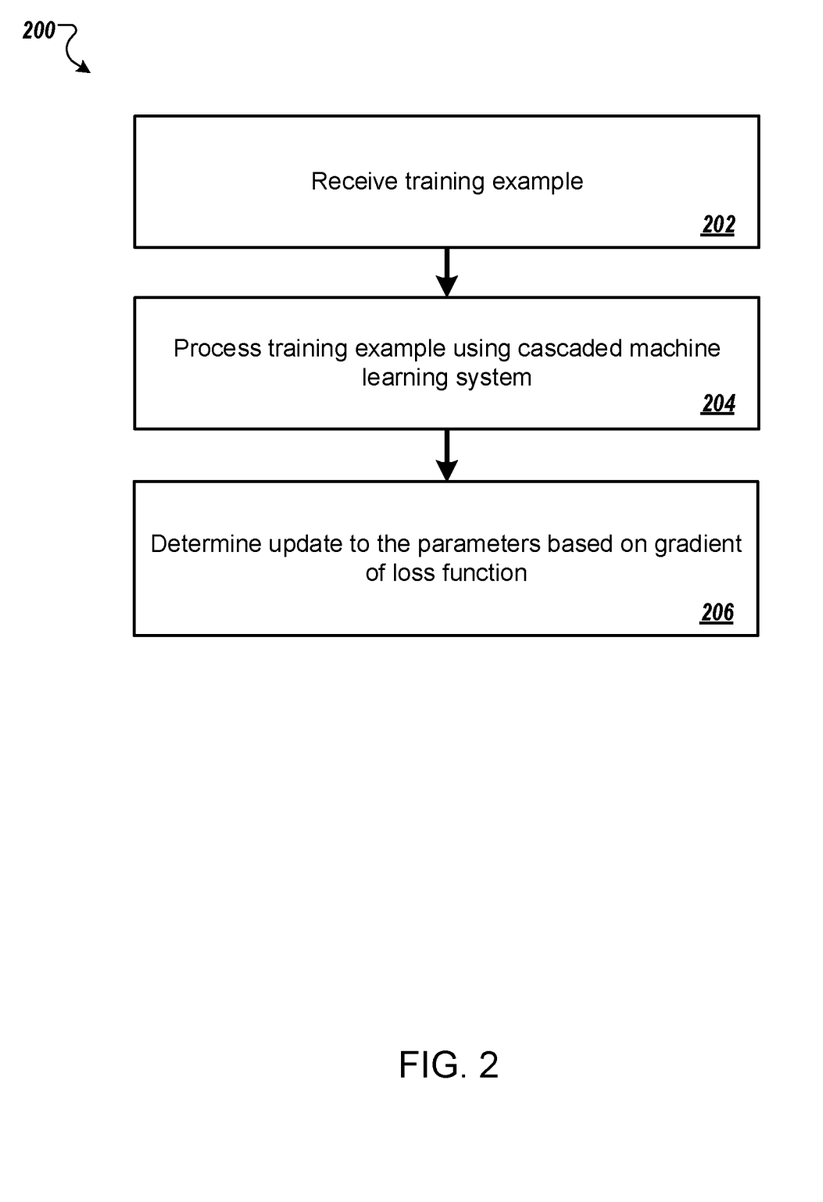
FIG. 2 is a flow chart of an example process for training the cascaded machine learning system.

FIG. 2 is a flow diagram of an example process 200 for training the cascaded neural network system. For convenience, the process 200 will be described as being performed by a system of one or more computers located in one or more locations. For example, a question answering system, e.g., the question answering system 100 of FIG. 1, appropriately programmed, can perform the process 200.

The system can repeatedly perform the process 200 on multiple training examples to repeatedly update the values of the parameters of the cascaded neural network system.

The system obtains a training example (step 202). The training example includes a training question and a training document and identifies a correct word span from the training document that best answers the question.

The system processes the training question and the training document using the cascaded neural network system to generate (i) a final score for the unique word span corresponding to the correct word span and (ii) scores for each of the models 160-180 for each mention of the correct word span in the training document (step 204).

In particular, as described above, while after training only the final score is used to select the best answer for the input question, during training each of the models 160-180 is configured to generate a respective score for each candidate word span in the training document.

The system determines an update to the parameters of the cascaded machine learning system by determining a gradient of a loss function with respect to the parameters (step 206). As can be seen in the example of FIG. 1B, the loss function l includes terms $l_1$, $l_2$, $l_3$, and $l_4$ that each depend on the scores generated by a corresponding one of the models 160-190. In particular, the loss function includes, for each of the models 160-180, a respective loss term that depends on the scores assigned to the mentions of the correct word span in the training document and, for the model 190, a loss term that depends on the final score assigned to the unique word span corresponding to the correct word span by the model 190.

In particular, the loss function can be the total negative log likelihood of the correct answer spans under all the sub-models 160-190. For example, the loss function can be expressed as:

$$-\sum_{k=1}^{3} \lambda_k \log \sum_{\hat{s} \in S^*} p^{(k)}(\hat{s} | q, d) - \lambda_4 \log \sum_{\hat{u} \in S^*} p^{(4)}(\hat{u} | q, d)$$

where each $\lambda$ is a hyperparameter such that the $\lambda$s add to 1, $S^*$ is the set of all mentions of the correct answer span in the training document, $p^{(k)}(s|q,d)$ is the score assigned to a mention s in the set $S^*$ by the k-th model of the models 160-180, and $p^{(4)}(u|q,d)$ is the final score assigned to a unique answer span by the model 190.

The system can determine the gradient with respect to each of the parameters using a machine learning training technique, e.g., backpropagation, and can then then determine the update from the gradient by applying an update rule, e.g., an ADAM update rule, an rmsprop update rule, or a stochastic gradient descent learning rate, to the gradients.

Figure 3:
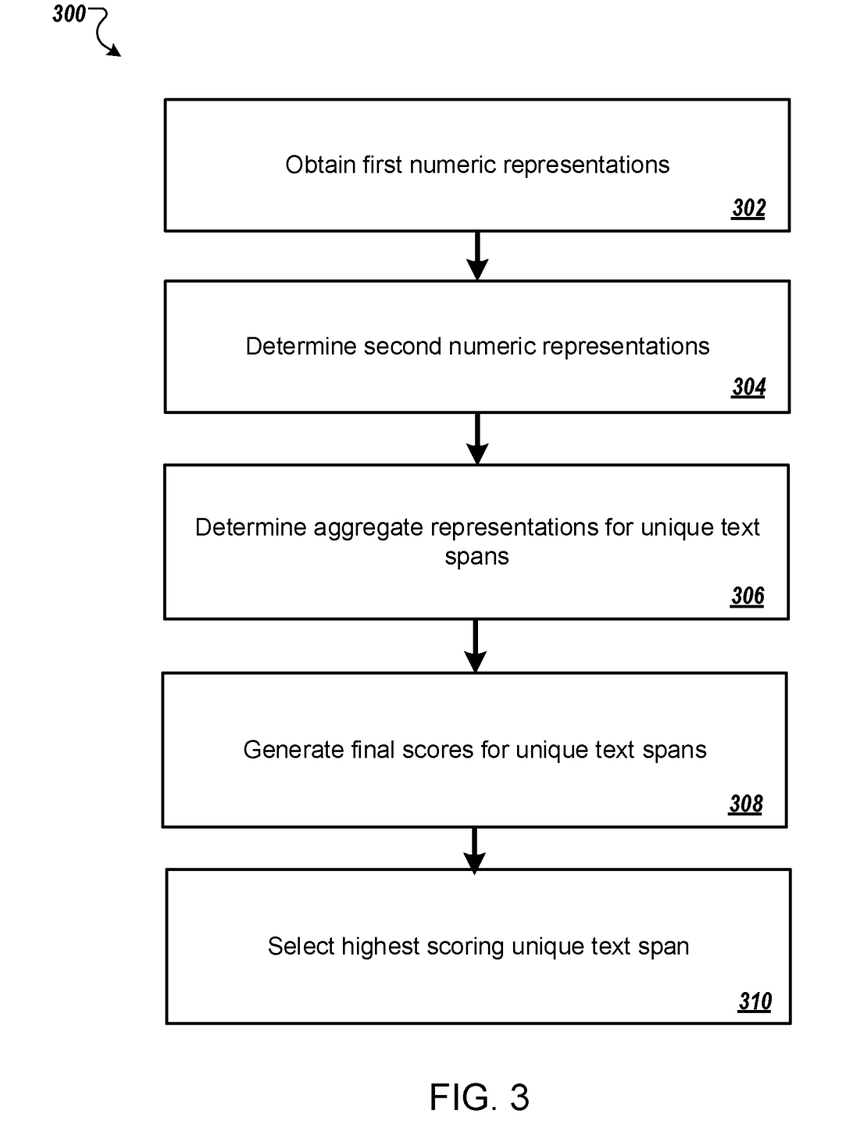
FIG. 3 is a flow chart of an example process for selecting an answer span from an input document.

FIG. 3 is a flow diagram of an example process 300 for selecting a text span from an electronic document in response to a question. For convenience, the process 300 will be described as being performed by a system of one or more computers located in one or more locations. For example, a question answering system, e.g., the question answering system 100 of FIG. 1, appropriately programmed, can perform the process 100.

The system obtains a respective first numeric representation of each of a plurality of text spans in the input document (step 302). For example, the system can generate the respective first numeric representations using level 1 of the cascade machine learning system as described above.

The system determines, for each of the plurality of text spans, a respective second numeric representation (step 304). For example, the system can generate the second numeric representations using level 2 of the cascade machine learning system as described above. In particular, the system can, for each of the plurality of text spans: determine, for a segment that contains the text span in the input document, a question-aware segment vector that is based on a similarity between the question tokens in the question and segment tokens in the segment that contains the text span, determine, for the question, a segment-aware question vector for the question that is also based on the similarity between the question tokens in the question and segment tokens in the segment that contains the text span, and process the first numeric representation of the text span, the question-aware segment vector, and the segment-aware question vector using a second feedforward neural network to generate a second numeric representation of the text span.

The system determines, for each unique text span in the plurality of text spans, an aggregate representation for the unique text span from the second numeric representations of the text spans that correspond to the unique text span (step 306), and determines, from the aggregate representation, a final score for the unique text span that measures how well the unique text span answers the question (step 308).

The system selects the unique text span having the highest final score as the answer to the question (step 310).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method of selecting a text span from an input electronic document that answers an input question that includes a plurality of question tokens, the method comprising:
    obtaining a respective first numeric representation of each of a plurality of text spans in the input document;
    for each of the plurality of text spans:
        determining, for a segment that contains the text span in the input document, a question-aware segment vector that is based on a similarity between the question tokens in the question and segment tokens in the segment that contains the text span,
        determining, for the question, a segment-aware question vector for the question that is also based on the similarity between the question tokens in the question and segment tokens in the segment that contains the text span, and
        processing the first numeric representation of the text span, the question-aware segment vector, and the segment-aware question vector using a second feedforward neural network to generate a second numeric representation of the text span;
    for each unique text span in the plurality of text spans:
        determining an aggregate representation for the unique text span from the second numeric representations of the text spans that correspond to the unique text span, and
        determining, from the aggregate representation, a final score for the unique text span that measures how well the unique text span answers the question; and
    selecting a unique text span having a highest final score as an answer to the question.

2. The method of claim 1, further comprising:
    outputting the selected unique text span in a response to the question.

3. The method of claim 2, wherein the question is received as a voice input, and wherein outputting the unique text span comprises:
    outputting a verbal utterance of the text span as part of the response to the question.

4. The method of claim 1, wherein determining an aggregate representation for the unique text span comprises:
    processing the second numeric representations for each of the text spans that correspond to the unique text span using a third feedforward neural network to generate a respective transformed numeric representation for each of the text spans; and
    determining the aggregate representation by summing the transformed numeric representations.

5. The method of claim 1, wherein determining the final score for the unique text span comprises:
    processing the aggregate representation of the unique text span using a linear prediction layer to generate the final score.

6. The method of claim 1, wherein determining the question-aware segment vector for the segment in the input document that contains the text span comprises:
- determining a respective attended vector for each segment token that accounts for a similarity of the segment token to the question tokens; and
- determining the question-aware segment vector from the attended vectors for the segment tokens.

7. The method of claim 1, wherein determining the segment-aware question vector for the question comprises:
- determining a respective attended vector for each question token that measures a similarity of the question token to the segment tokens; and
- determining the segment-aware question vector from the attended vectors for the question tokens.

8. The method of claim 1, wherein the second numeric representation is an output of a last hidden layer in the second feedforward neural network.

9. The method of claim 1, wherein obtaining a respective first numeric representation of each of the plurality of text spans in the input document comprises, for each text span:
- obtaining an initial representation of the text span that is based on the tokens in the text span;
- obtaining an initial representation of the question that is based on the question tokens; and
- determining a question-span representation of the text span from the initial representation of the text span and the initial representation of the question.

10. The method of claim 9, wherein obtaining a respective first numeric representation of each of the plurality of text spans in the input document comprises, for each text span:
- obtaining an initial representation of a left context of the text span in the document that is based on the tokens in the left context of the text span;
- obtaining an initial representation of a right context of the text span in the document that is based on the tokens in the right context of the text span; and
- determining a span-context representation of the text span from the initial representation of the text span and the initial representations of the left context and right context.

11. The method of claim 10, wherein the first representation is a concatenation of the question-span representation and the span-context representation.

12. The method of claim 9, wherein the initial representation of the text span is a bag of words embedding of the tokens in the text span.

13. The method of claim 9, wherein the initial representation of the text span is a concatenation of a bag of words embedding of the tokens in the text span and a question-word feature that indicates whether the text span includes any of the question tokens.

14. A system comprising one or more computers and one or more storage devices storing instructions that when executed by the one or more computers cause the one or more computers to perform operations for selecting a text span from an input electronic document that answers an input question that includes a plurality of question tokens, the method comprising:
- obtaining a respective first numeric representation of each of a plurality of text spans in the input document;
- for each of the plurality of text spans:
  - determining, for a segment that contains the text span in the input document, a question-aware segment vector that is based on a similarity between the question tokens in the question and segment tokens in the segment that contains the text span,
  - determining, for the question, a segment-aware question vector for the question that is also based on the similarity between the question tokens in the question and segment tokens in the segment that contains the text span, and
  - processing the first numeric representation of the text span, the question-aware segment vector, and the segment-aware question vector using a second feedforward neural network to generate a second numeric representation of the text span;
- for each unique text span in the plurality of text spans:
  - determining an aggregate representation for the unique text span from the second numeric representations of the text spans that correspond to the unique text span, and
  - determining, from the aggregate representation, a final score for the unique text span that measures how well the unique text span answers the question; and
- selecting a unique text span having a highest final score as an answer to the question.

15. The system of claim 14, the operations further comprising:
- outputting the selected unique text span in a response to the question.

16. The system of claim 15, wherein the question is received as a voice input, and wherein outputting the unique text span comprises:
- outputting a verbal utterance of the text span as part of the response to the question.

17. One or more non-transitory computer-readable storage media storing instructions that when executed by one or more computers cause the one or more computers to perform operations for selecting a text span from an input electronic document that answers an input question that includes a plurality of question tokens, the method comprising:
- obtaining a respective first numeric representation of each of a plurality of text spans in the input document;
- for each of the plurality of text spans:
  - determining, for a segment that contains the text span in the input document, a question-aware segment vector that is based on a similarity between the question tokens in the question and segment tokens in the segment that contains the text span,
  - determining, for the question, a segment-aware question vector for the question that is also based on the similarity between the question tokens in the question and segment tokens in the segment that contains the text span, and
  - processing the first numeric representation of the text span, the question-aware segment vector, and the segment-aware question vector using a second feedforward neural network to generate a second numeric representation of the text span;
- for each unique text span in the plurality of text spans:
  - determining an aggregate representation for the unique text span from the second numeric representations of the text spans that correspond to the unique text span, and
  - determining, from the aggregate representation, a final score for the unique text span that measures how well the unique text span answers the question; and
- selecting a unique text span having a highest final score as an answer to the question.

18. The system of claim 17, wherein determining the final score for the unique text span comprises:

processing the aggregate representation of the unique text span using a linear prediction layer to generate the final score.

19. The system of claim 17, wherein determining the question-aware segment vector for the segment in the input document that contains the text span comprises:
   determining a respective attended vector for each segment token that accounts for a similarity of the segment token to the question tokens; and
   determining the question-aware segment vector from the attended vectors for the segment tokens.

20. The system of claim 17, wherein determining an aggregate representation for the unique text span comprises:
   processing the second numeric representations for each of the text spans that correspond to the unique text span using a third feedforward neural network to generate a respective transformed numeric representation for each of the text spans; and
   determining the aggregate representation by summing the transformed numeric representations.

* * * * *

UNITED STATES PATENT AND TRADEMARK OFFICE
CERTIFICATE OF CORRECTION

PATENT NO. : 11,481,646 B2
APPLICATION NO. : 16/759692
DATED : October 25, 2022
INVENTOR(S) : Kwiatkowski et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this
Sixth Day of February, 2024

Katherine Kelly Vidal
*Director of the United States Patent and Trademark Office*